United States Patent
Vedantham et al.

(10) Patent No.: US 9,698,866 B2
(45) Date of Patent: Jul. 4, 2017

(54) SCHEDULING FOR CHARGER AND ELECTRIC VEHICLE COMMUNICATION IN POWER LINE COMMUNICATION SYSTEM

(71) Applicant: Texas Instruments Incorporated, Dallas, TX (US)

(72) Inventors: Ramanuja Vedantham, Allen, TX (US); Xiaolin Lu, Plano, TX (US); Kumaran Vijayasankar, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 840 days.

(21) Appl. No.: 13/693,298

(22) Filed: Dec. 4, 2012

(65) Prior Publication Data
US 2013/0148746 A1   Jun. 13, 2013

Related U.S. Application Data

(60) Provisional application No. 61/569,514, filed on Dec. 12, 2011.

(51) Int. Cl.
*H04B 3/54*   (2006.01)

(52) U.S. Cl.
CPC ............. *H04B 3/54* (2013.01); *H04B 3/548* (2013.01); *H04B 2203/547* (2013.01)

(58) Field of Classification Search
CPC ............................ H04B 2203/547; H04B 3/56
USPC ............................................................ 307/3
See application file for complete search history.

(56) References Cited

U.S. PATENT DOCUMENTS

| 5,602,459 | A | 2/1997 | Rogers |
| 6,567,474 | B1 * | 5/2003 | Bullock .................. H04B 3/54 340/12.33 |
| 7,028,819 | B2 | 4/2006 | Saito et al. |
| 8,405,939 | B2 | 3/2013 | Haines |
| 8,432,175 | B2 | 4/2013 | Hein |

(Continued)

FOREIGN PATENT DOCUMENTS

| JP | 2008236902 A | 10/2008 |
| JP | 2008278569 A | 11/2008 |

(Continued)

OTHER PUBLICATIONS

KR10044618881—English Machine Translation.

(Continued)

*Primary Examiner* — Thienvu Tran
*Assistant Examiner* — David M Stables
(74) *Attorney, Agent, or Firm* — Rose Alyssa Keagy; Charles A. Brill; Frank D. Cimino

(57) ABSTRACT

Systems and methods for establishing scheduling for charger and electric vehicle communication in a PLC system are described. In an illustrative embodiment, a method performed by a PLC device. In a further embodiment, the PLC device may be configured to operate according to a narrow-band PLC communication protocol. In a further embodiment, the narrow-band PLC communications between PLC devices in the charger and the electric vehicle are conducted over a pilot wire coupling the charger to the electric vehicle. In still a further embodiment, the pilot wire may be one of a standard set of existing wires in a standard cable used for connecting the charger to the electric vehicle.

20 Claims, 6 Drawing Sheets

(56) References Cited

U.S. PATENT DOCUMENTS

| | | |
|---|---|---|
| 8,447,543 B2 | 5/2013 | Dickinson et al. |
| 2003/0133473 A1* | 7/2003 | Manis ............... H04B 3/542 370/480 |
| 2009/0251300 A1* | 10/2009 | Yasuda ............... B60L 11/1816 340/426.1 |
| 2009/0278547 A1 | 11/2009 | Acena et al. |
| 2009/0301801 A1 | 12/2009 | Fujitake |
| 2009/0323239 A1 | 12/2009 | Markyvech |
| 2010/0097029 A1 | 4/2010 | McCabe |
| 2010/0111199 A1* | 5/2010 | Sharma ............... H04B 3/542 375/257 |
| 2010/0316140 A1 | 12/2010 | Razazian |
| 2012/0022811 A1 | 1/2012 | Dickinson et al. |
| 2012/0032636 A1 | 2/2012 | Bianco |
| 2012/0116745 A1 | 5/2012 | Dickinson et al. |
| 2013/0015815 A1 | 1/2013 | Bianco |
| 2013/0094552 A1 | 4/2013 | Vedantham et al. |
| 2013/0190968 A1 | 7/2013 | Nitzberg et al. |
| 2013/0307551 A1 | 11/2013 | Makino |
| 2013/0320920 A1 | 12/2013 | Jefferies et al. |

FOREIGN PATENT DOCUMENTS

| | | |
|---|---|---|
| JP | 2009189143 A | 8/2009 |
| KR | 100446186 B1 | 8/2004 |
| KR | 1020050061013 A | 6/2005 |
| KR | 100657873 B1 | 12/2006 |
| KR | 1020080021183 A | 3/2008 |
| KR | 100932479 B1 | 12/2009 |

OTHER PUBLICATIONS

KR1020080021183A—English Machine Translation.
KR100657873B1—English Machine Translation.
KR100932479B1—English Machine Translation.
KR1020050061013A—English Machine Translation
JP2008278559A—English Machine Translation.
JP2009189143A—English Machine Translation.
JP2008236902A—English Machine Translation.

* cited by examiner

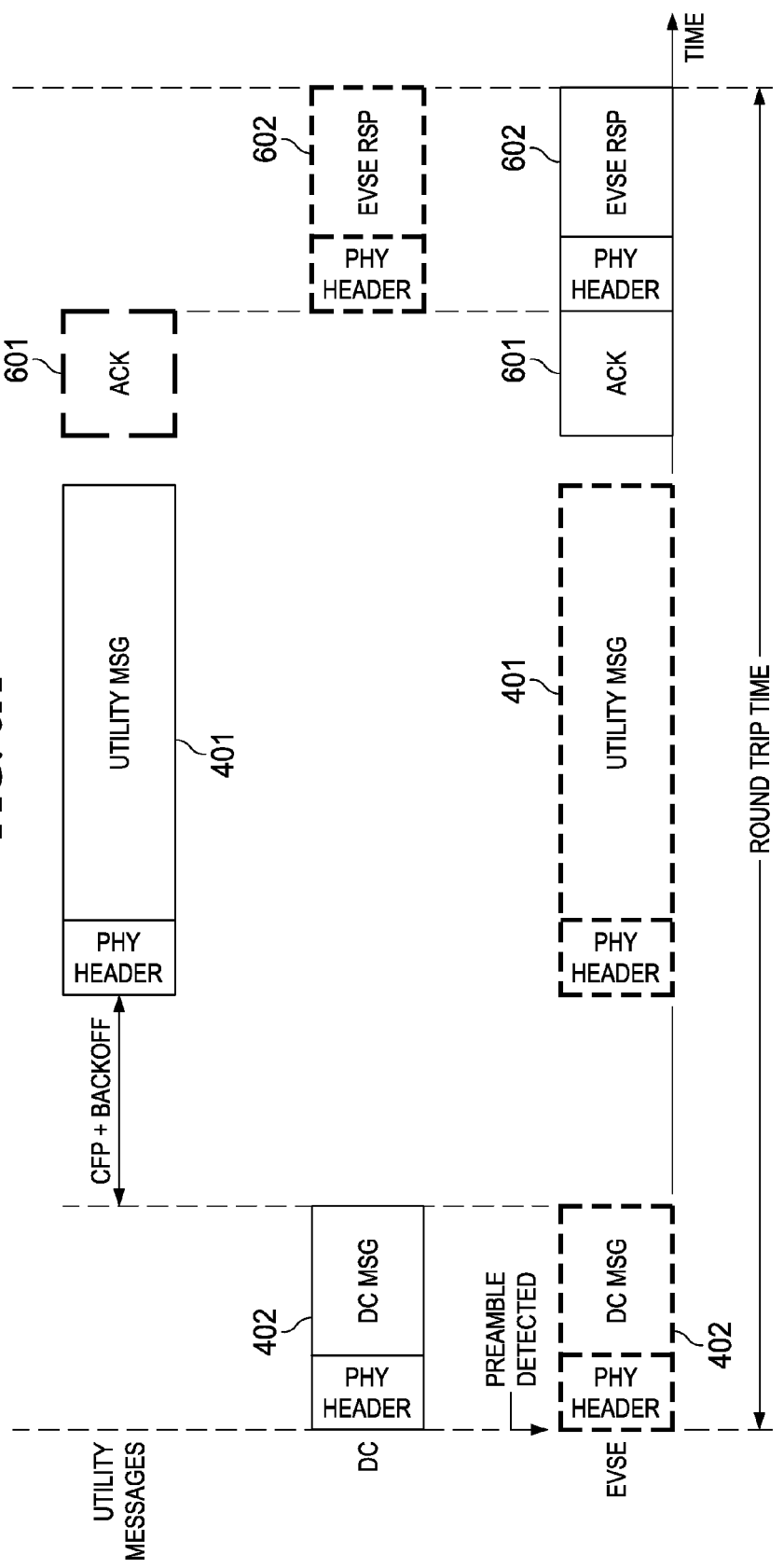

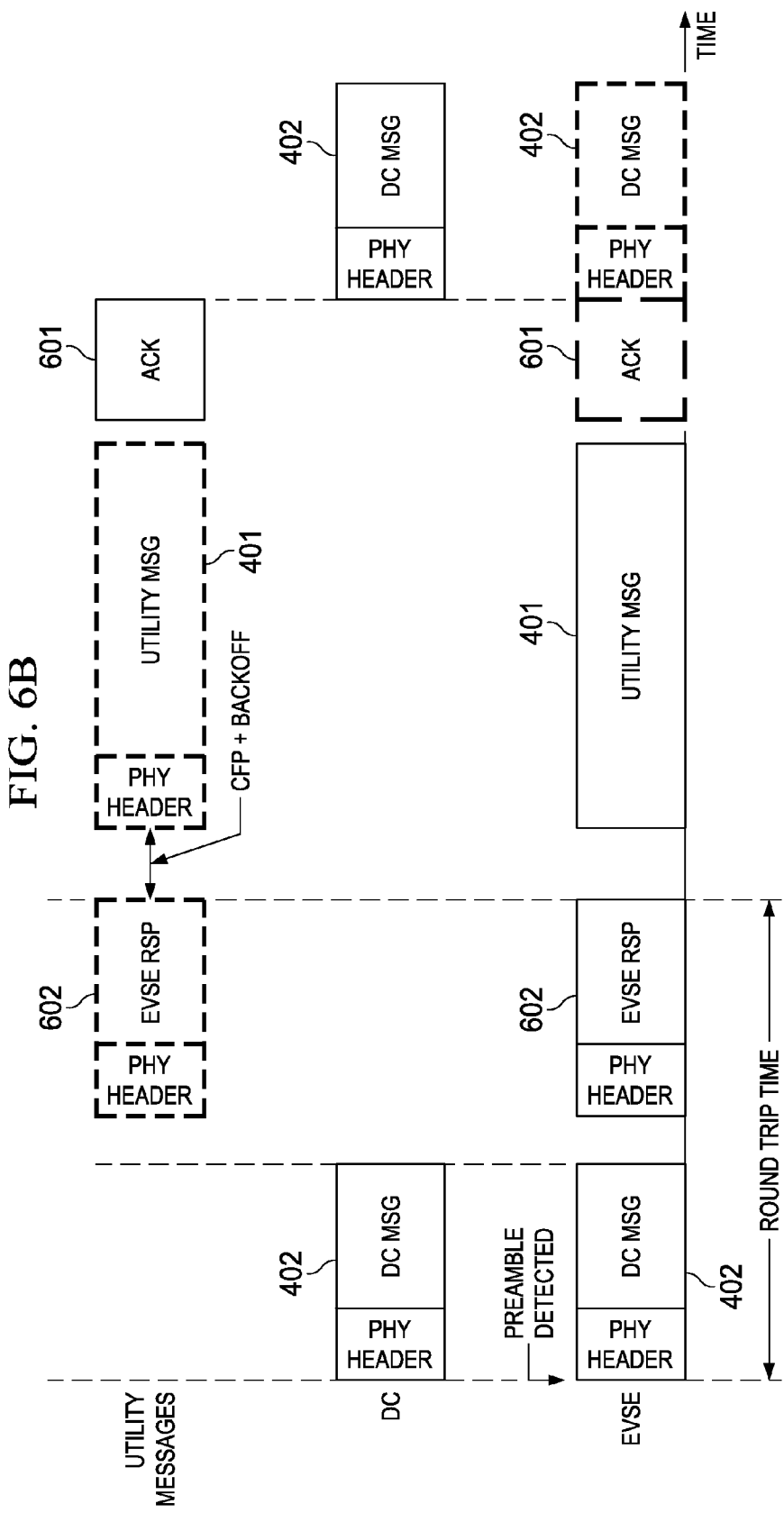

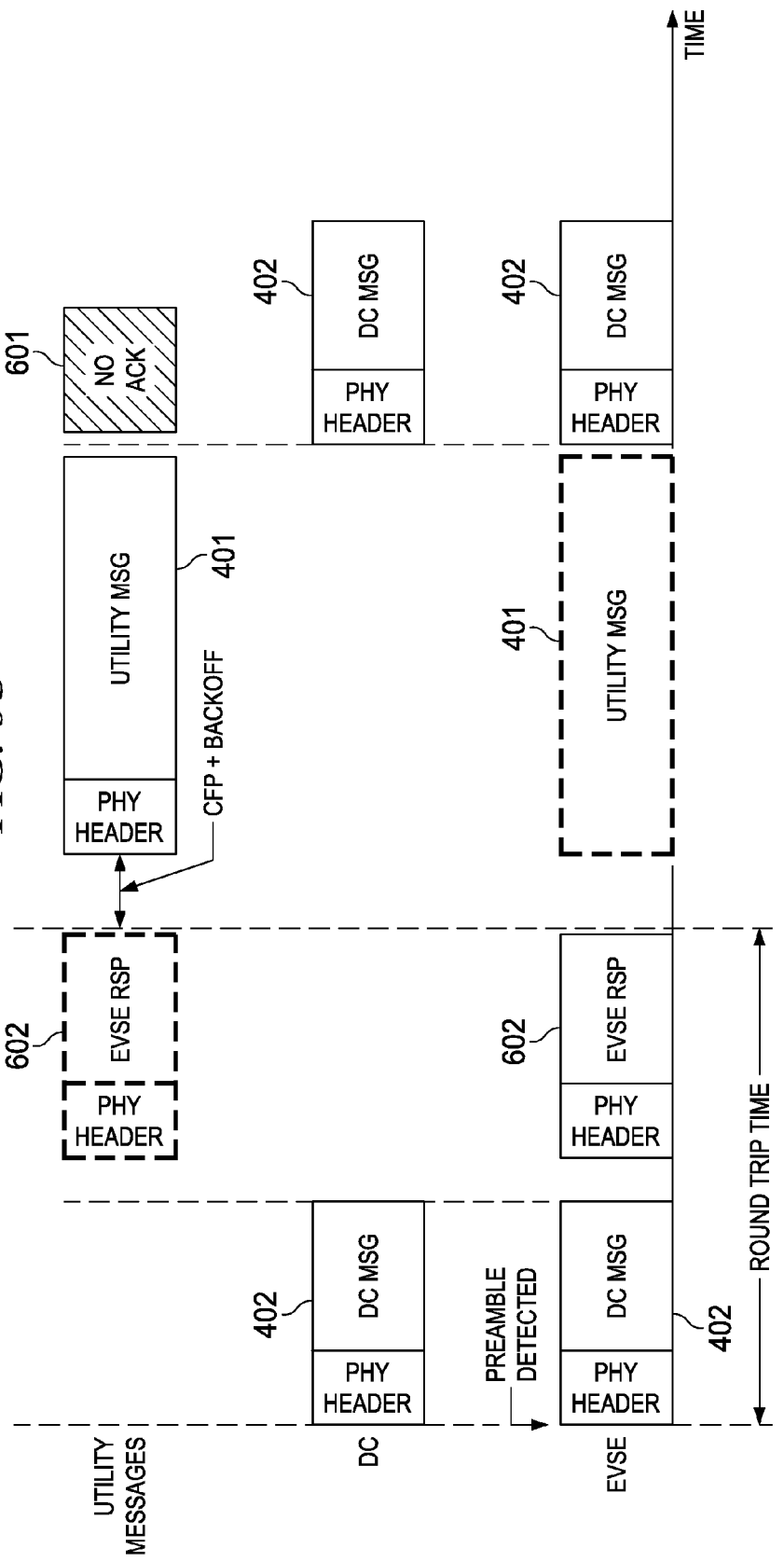

SCHEDULING FOR CHARGER AND ELECTRIC VEHICLE COMMUNICATION IN POWER LINE COMMUNICATION SYSTEM

CROSS-REFERENCE TO RELATED APPLICATION

This application claims the benefit of the filing date of U.S. Provisional Patent Application No. 61/569,514, which is titled "Scheduling for Charger and Electric Vehicle Communication in Power Line Communication System" and was filed on Dec. 12, 2011, the disclosure of which is hereby incorporated by reference herein in its entirety.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, lighting, and solar.

Using PLC to communicate with utility meters enable applications such as Automated Meter Reading (AMR) and Automated Meter Infrastructure (AMI) communications without the need to install additional wires. Consumers may also use PLC to connect home electric meters to an energy monitoring device or in-home display to monitor their energy consumption and to leverage lower-cost electric pricing based on time-of-day demand.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics. PRIME is designed for low voltage lines with low noise and targets higher data rates. On the other hand, G3 is designed for medium voltage lines and targets lower data rates.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC defines a single wide band from 150 to 450 kHz; however, PLC systems typically operate at 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

SUMMARY

Systems and methods for establishing scheduling for charger and electric vehicle communication in a PLC system are described. In an illustrative embodiment, a method performed by a PLC device. In a further embodiment, the PLC device may be configured to operate according to a narrow-band PLC communication protocol. In a further embodiment, the narrow-band PLC communications between PLC devices in the charger and the electric vehicle are conducted over a pilot wire coupling the charger to the electric vehicle. In still a further embodiment, the pilot wire may be one of a standard set of existing wires in a standard cable used for connecting the charger to the electric vehicle.

In one embodiment, the PLC device may include a processor and a memory coupled to the processor. The memory may be configured to store program instructions executable by the processor to cause the PLC device to assign a first priority to a first category of data messages to be communicated over a narrow-band PLC channel. Additionally, the PLC device may be configured to assign a second priority to a second category of data messages to be communicated over the narrow-band PLC channel, the second priority being higher than the first priority. In a further embodiment, the PLC device halts initiation of further communication of the first category of data messages in response to a determination that at least one data message having the second priority is queued for communication. The PLC device is also configured to communicate the at least one data message having the second priority in response to a determination that the narrow-band PLC channel is available. In a further embodiment, the PLC device is configured to reinitiate further communication of the first category of data messages in response to a determination that the at least one data message having the second priority has been communicated and in response to a determination that the narrow-band communication channel is available.

In a further embodiment, the determination that the narrow-band PLC channel is available may include waiting for active communication of data messages having the first priority to complete before communicating the at least one data message having the second priority. Halting initiation of further communication of the first category of data messages may further include halting an ACK response to any active communication of the data messages having the first priority completed.

The first category of data messages may be modulated according to a first modulation scheme selected to minimize the channel occupancy of the second category of data messages. In one embodiment, the first modulation scheme is D8PSK. Likewise, the second category of data messages are modulated according a second modulation scheme selected for robust communication. In one embodiment, the second modulation scheme is ROBO modulation. In another embodiment, the second modulation scheme is BPSK.

In one embodiment, the first category of data messages are utility messages. In such an embodiment, the second category of data messages may be DC messages.

In some embodiments, one or more of the methods described herein may be performed by one or more PLC devices (e.g., a PLC meter, PLC data concentrator, etc.). In other embodiments, a tangible electronic storage medium may have program instructions stored thereon that, upon execution by a processor within one or more PLC devices, cause the one or more PLC devices to perform one or more operations disclosed herein. Examples of such a processor include, but are not limited to, a digital signal processor (DSP), an application specific integrated circuit (ASIC), a system-on-chip (SoC) circuit, a field-programmable gate array (FPGA), a microprocessor, or a microcontroller. In yet other embodiments, a PLC device may include at least one processor and a memory coupled to the at least one processor, the memory configured to store program instructions executable by the at least one processor to cause the PLC device to perform one or more operations disclosed herein.

BRIEF DESCRIPTION OF THE DRAWINGS

Figure 1:
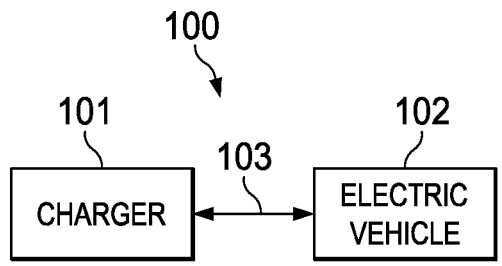

Having thus described the invention(s) in general terms, reference will now be made to the accompanying drawings, wherein:

FIG. 1 is a diagram of an electric vehicle charging system according to some embodiments.

Figure 2:
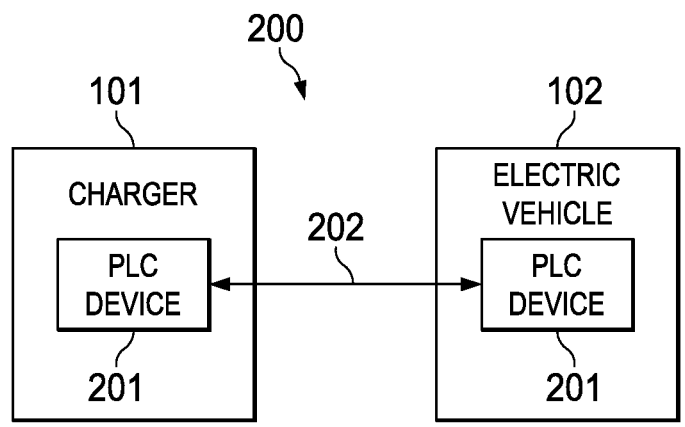

FIG. 2 is a block diagram of an electric vehicle charging system that supports PLC communication between the charger and the electric vehicle.

Figure 3:
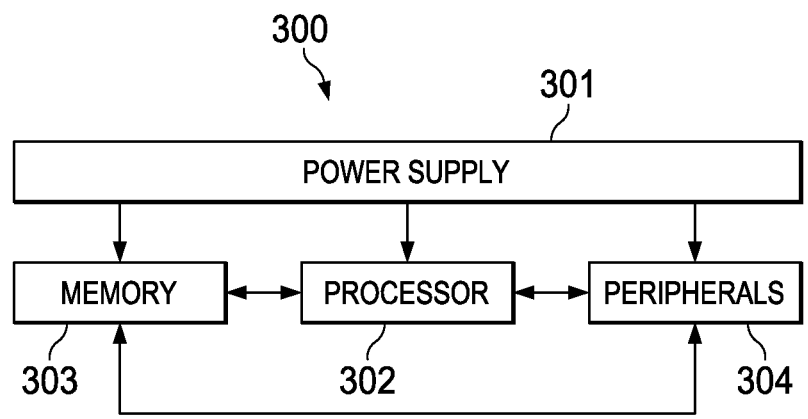

FIG. 3 is a block diagram of a computing device that may be adapted according to embodiments of a PLC device.

Figure 4:
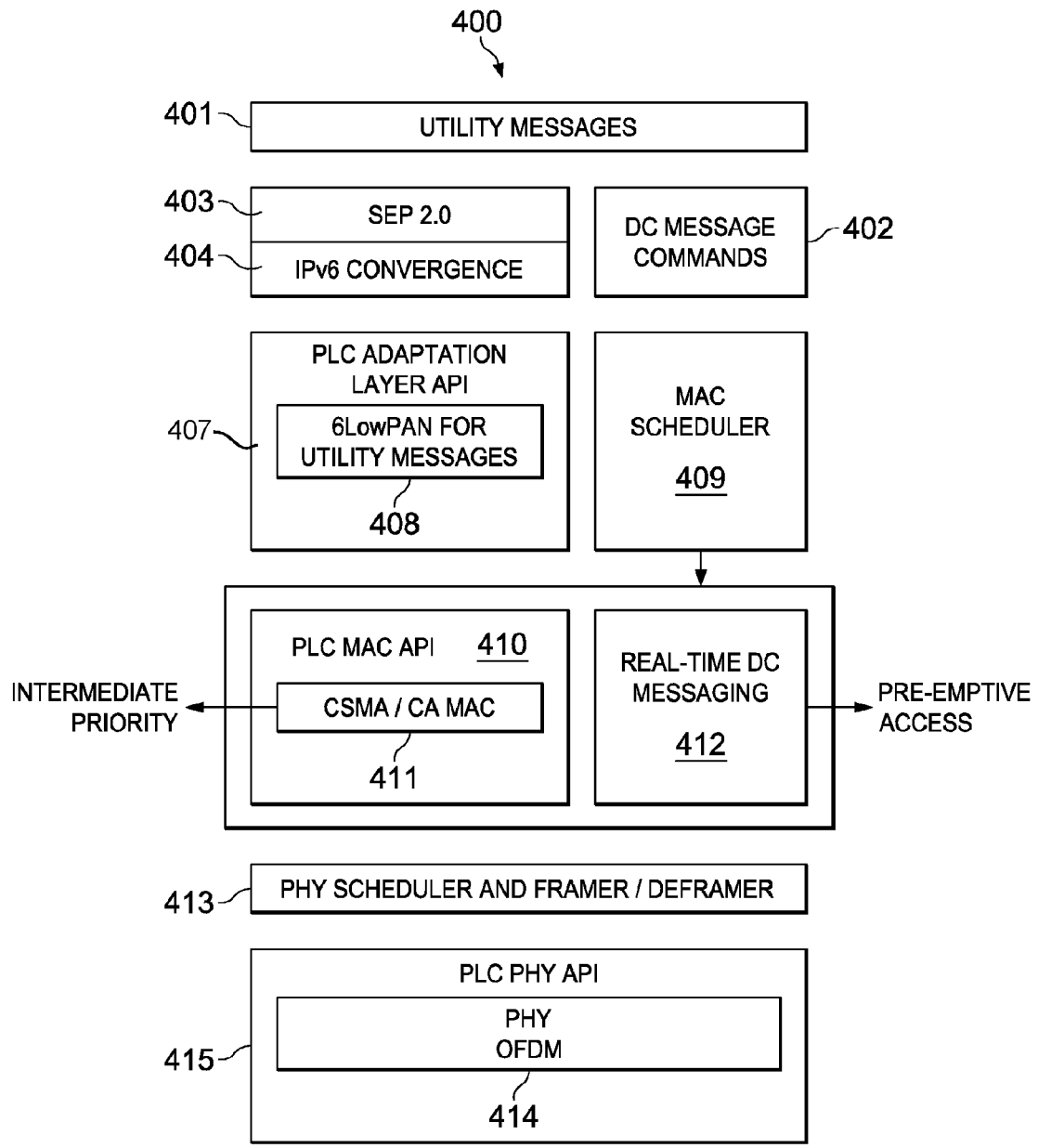

FIG. 4 is a software stack diagram of a scheme for scheduling PLC communications between a charger and an electric vehicle according to some embodiments.

Figure 5:
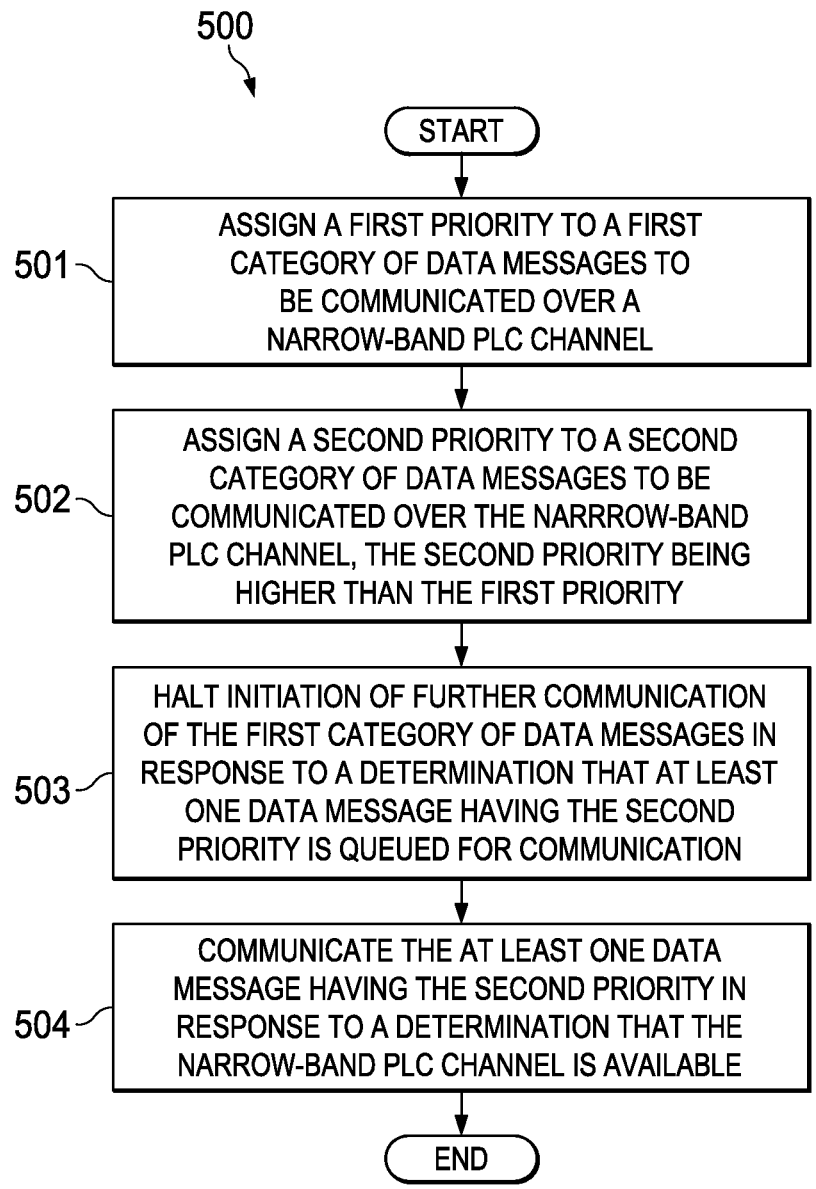

FIG. 5 is a flowchart diagram illustrating one embodiment of a method for scheduling PLC communications between a charger and an electric vehicle according to some embodiments.

FIG. 6A is a timing diagram illustrating an embodiment of PLC communications between a charger and an electric vehicle where the DC command immediately follows an ACK response to a utility message.

FIG. 6B is a timing diagram illustrating an embodiment of PLC communications between a charger and an electric vehicle where a response to a DC command preempts a utility message.

FIG. 6C is a timing diagram illustrating an embodiment of PLC communications between a charger and an electric vehicle where a DC command overrides an ACK response to a utility message.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

FIG. 1 illustrates one embodiment of a system 100 for establishing scheduling of communication between a charger 101 and electric vehicle 102. In various embodiments, the charger 101 may be coupled to the electric vehicle 102 by a charging cable 103. The charging cable 103 may include, for example, a multi-wire charging cable 103 having a pilot wire 202 as shown below in FIG. 2. In still a further embodiment, the pilot wire may be one of a standard set of existing wires in a standard cable used for connecting the charger 101 to the electric vehicle 102. In such an embodiment, charging commands including DC commands and utility messages may be communicated between the charger 101 and the electric vehicle 102.

In a further embodiment, the communications between the charger 101 and the electric vehicle 102 may be conducted over one or more wires of the charging cable 103 according to a narrow-band PLC communication protocol. In a further embodiment, the narrow-band PLC communications between PLC device 201 in the charger 101 and the electric vehicle 102 are conducted over a pilot wire coupling the charger 101 to the electric vehicle 102. An illustrative method for transmitting data over power lines may use a carrier signal having a frequency different from that of the power signal. The carrier signal may be modulated by the data, for example, using an OFDM technology or the like described, for example, by the PRIME, G3 or IEEE 1901 standards.

FIG. 2 illustrates one embodiment of a system 200 for narrow-band PLC communications over a pilot wire 202. Some advantages of conducting communications over the pilot wire 202 rather than conducting communication over the power mains include 1) a more benign environment exists on the control pilot making it easier to communicate reliably and at higher bitrates, and 2) the usable bandwidth is not nearly as restricted in certain countries. For example, for PLC in European countries, EV communications is currently limited to the Cenelec B, C, and D band frequencies between 95 KHz and 148.5 KHz (53.5 KHz bandwidth when using the mains). In contrast, in Europe, the full bandwidth between 3 KHz and 500 KHz (491 KHz bandwidth) can be exploited using the control pilot wire. This could result in nearly 10× the bitrate performance compared to using the mains.

Use of narrowband OFDM technologies such as G3 and IEEE p1901.2 to communicate between the charger 101 and the electric vehicle 102 may also be advantageous. For example, this PLC technology facilitates communication between the charger 101 and the electric vehicle 102 over existing wires already used in standard EV charging cables 103. In one embodiment, a frequency band plan for the communication may include subsets within the 3 KHz-500 KHz band.

In one embodiment, it may be beneficial for communication between the charger 101 and the electric vehicle 102 is to have round trip latency for certain DC commands of the order of 25 ms. It would be further beneficial if this latency benefit did not come at the expense of compromising the utility-electric vehicle communication. Thus, the present embodiments provide effective scheduling mechanisms to schedule DC messages/commands and the utility messages at the PLC device 201 of both the charger 101 and the electric vehicle 102.

The PLC device 201 may include a processor 302 and a memory 303 coupled to the processor 302 as shown in FIG. 3. The memory 303 may be configured to store program instructions executable by the processor 302 to cause the PLC device 201 to assign a first priority to a first category of data messages to be communicated over a narrow-band PLC channel. Additionally, the PLC device 201 may be configured to assign a second priority to a second category of data messages to be communicated over the narrow-band PLC channel, the second priority being higher than the first priority. In a further embodiment, the PLC device 201 halts initiation of further communication of the first category of data messages in response to a determination that at least one data message having the second priority is queued for communication. The PLC device 201 is also configured to communicate the at least one data message having the second priority in response to a determination that the narrow-band PLC channel is available. In a further embodiment, the PLC device 201 is configured to reinitiate further communication of the first category of data messages in response to a determination that the at least one data message having the second priority has been communicated and in response to a determination that the narrow-band communication channel is available.

In a further embodiment, the determination that the narrow-band PLC channel is available may include waiting for active communication of data messages having the first priority to complete before communicating the at least one data message having the second priority. Halting initiation of further communication of the first category of data messages may further include halting an ACK response to any active communication of the data messages having the first priority completed.

The first category of data messages may be modulated according to a first modulation scheme selected to minimize the channel occupancy of the second category of data messages. In one embodiment, the first modulation scheme is D8PSK. Likewise, the second category of data messages are modulated according a second modulation scheme selected for robust communication. In one embodiment, the second modulation scheme is ROBO modulation. In another embodiment, the second modulation scheme is BPSK.

In one embodiment, the first category of data messages are utility messages. In such an embodiment, the second category of data messages may be DC messages.

FIG. 3 is a block diagram of a circuit for implementing a process for scheduling communications between charger 101 and electric vehicle 102 according to some embodiments. In some cases, one or more of the devices and/or apparatuses shown in FIGS. 1-2 may be implemented as shown in FIG. 3. In some embodiments, processor 302 may be a digital signal processor (DSP), an application specific integrated circuit (ASIC), a system-on-chip (SoC) circuit, a field-programmable gate array (FPGA), a microprocessor, a microcontroller, or the like. Processor 302 is coupled to one or more peripherals 304 and external memory 303. In some cases, external memory 303 may be used to store and/or maintain databases 304 and/or 404 shown in FIGS. 3 and 4. Further, processor 302 may include a driver for communicating signals to external memory 303 and another driver for communicating signals to peripherals 304. Power supply 301 provides supply voltages to processor 302 as well as one or more supply voltages to memory 303 and/or peripherals 304. In some embodiments, more than one instance of processor 302 may be included (and more than one external memory 303 may be included as well).

Peripherals 304 may include any desired circuitry, depending on the type of PLC system. For example, in an embodiment, peripherals 304 may implement local communication interface and include devices for various types of wireless communication, such as WI-FI, ZIGBEE, BLUETOOTH, cellular, global positioning system, etc. Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc.

External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 303 may include one or more memory modules to which the memory devices are mounted, such as single inline memory modules (SIMMs), dual inline memory modules (DIMMs), etc.

FIG. 4 illustrates a software stack 400 for the scheduling schemes described. The mechanism involves assigning different priorities and connection types to the DC messages/commands 402 and utility messages 401. In one embodiment, the utility messages 401 are assigned intermediate traffic priority with maximum back-off slot duration of up to 7 slots (14 symbols as defined in G3 and the IEEE P1901.2 specification). The DC messages/commands 402, on the other hand, may be assigned the highest priority and can pre-empt any utility message 401 or ACK to a utility message 401 yet to be transmitted/detected. FIGS. 6A-C capture this aspect from a transmitter of the DC message 402 for various scenarios.

Further, the two categories of messages 401, 402 follow different paths of the protocol stack 400. The utility messages 401 go through the Smart Energy Profile (SEP) 2.0 application convergence protocol stack 403, the IPv6 convergence layer 404, and the IPv6 over Low power Wireless Personal Area Networks (6LowPAN) convergence sublayer 408, which is part of the PLC adaptation layer Application Program Interface (API) 407, before being handled at the MAC layer 410. In one embodiment, the utility messages 401 may be scheduled for transmission as usual by the MAC scheduler 409 under ordinary conditions. Additionally, a Carrier Sense Multiple Access with Collision Avoidance (CSMA/CA) protocol may be carried out on utility messages 401 to allow interoperability between PLC devices in a hybrid system where the PLC devices may be configured according to different protocols.

The SEP 2.0 sublayer 403 may be configured to handle communications of messages on a smart-grid network. Some embodiments of SEP may use, for example, ZIGBEE protocols. The IPv6 convergence sublayer 404 may be configured to packetize the utility messages 401 in IP packets suitable for communication over IP networks. One of ordinary skill in the art may recognize that other transport protocols may be used. The 6LoWPAN sublayer 408 may be used to ensure that the IPv6 packets are configured for transmission over a low-power network. In one embodiment, the 6LoWPAN sublayer 408 may be included as part of a PLC Adaptation Layer API 407 for interfacing between standard IP network communications and PLC communications.

The DC commands and messages 402, on the other hand, may directly interact with the MAC layer 410, as shown in block 412, since they are only within the local neighborhood (1-hop). This also avoids the overhead incurred at the convergence layers 403, 404 to comply with latency requirements. Accordingly, the DC messages 402 are given pre-emptive access to the channel, as shown at block 412. In other words, the DC messages 402 are given higher priority access to the PLC communication channel by the MAC layer API 410 than the utility messages 401.

In such an embodiment, the utility messages 401 may be sent with the highest achievable modulation (e.g., D8PSK) at OFDM block 414 so that the messages 401 can be accommodated between DC messages 402 and their responses. In the event the message cannot be sent with the highest modulation scheme, the utility message 401 is segmented into appropriate bytes at the MAC layer, for example by PHY scheduler and framer/deframer 413, and transmitted with the best possible modulation scheme to reduce the channel occupancy of any single frame by the PLC physical layer 414. The DC messages 402, on the other hand, may be sent with a more robust modulation scheme as defined by OFDM block 414, while meeting latency requirements, primarily because they are small sized frames and they may be transmitted with no MAC level retransmissions. In one embodiment, the OFDM sublayer 414 may be included in the PLC PHY API sublayer 415 for handling physical layer transmissions over the PLC channel.

FIG. 5 illustrates one embodiment of the method 500. In one embodiment, the method 500 starts when the PLC device 201 assigns 501 a first priority to a first category of data messages to be communicated over the narrowband PLC channel. For example, the first category of data messages may include utility messages. The messages may be communicated in data packets.

The method 500 continues when the PLC device 201 assigns 502 a second priority to a second category of data messages. For example, the second category of data messages may include DC messages, such as charging control messages sent between the charger 101 and the electric vehicle 102. In such an example, the second priority may be higher than the first priority, such that DC messages take precedence over utility messages.

DC messages and utility messages may be queued respectively for transmission. In such an embodiment, the method 500 may include halting 503 initiation of further communication of the utility messages in response to a determination that a DC message has been queued. As shown in FIG. 6, utility messages that are actively being transmitted on the communication channel may be allowed to finish transmission, but initiation of any further communication of utility messages may be halted 503. In still a further embodiment, even ACK responses to active utility messages may be halted 503 in favor of the DC messages.

Once it is determined that the communication channel is available, then the PLC device 201 may communicate 504 the DC messages. For example, the PLC device 201 may wait a predetermined time period after the halting initiation of further utility messages before transmitting the DC messages. The predetermined time period may be selected according to a packet length or time slot allocated to transmission of the utility messages in one embodiment.

In still further embodiments, the utility messages may be reinitiated in response to a determination that the channel is available after the DC messages are transmitted.

FIGS. 6A-C illustrate embodiments of interleaving of the DC commands 402 and utility messages 401 for various scenarios, in order to meet latency requirements. The time interval between DC commands 402 and their responses may be exploited for communication of utility messages 401. In such an embodiment, however, the frame duration of the utility messages 401 may be limited so that round trip latency requirements can be met as shown in FIG. 6A. For example, a utility message 401 and corresponding ACK message 601 may be received in a short time-slot between the DC message 402 and the corresponding EV response 602 as shown.

In other embodiments, a DC message 402 or EV response 602 may have higher priority than a utility message 401 that is yet to be transmitted. For example, as shown in FIG. 6B, the DC messages 402 and EV responses 602 may have to wait for a small duration of time if the utility message 401 is currently being transmitted. In a further embodiment, there may be some level of synchronization performed between the DC message 402 transmission and the utility message 401 transmission to ensure that round-trip latency requirements are met. For example, the DC command messages 402 may be generated only at the end of frame so that there is no delay incurred in the transmission of the initial DC message. The charger 101 may monitor for ongoing utility messages 401 and use this information to generate the DC commands 402 only after the end of the ongoing utility message 401 transmission as shown in FIG. 6B.

In a further embodiment, the DC messages 402 may even be given higher priority than an ACK message 601 to an on-going utility message 401. For example, as shown in FIG. 6C, the MAC layer 410 may continue an ongoing transmission of a utility message 401, but cut off the corresponding ACK message 601 in order to provide access for transmission of the DC messages 402. Accordingly, the DC messages may be given pre-emptive access, even before the ACK message 601 may be sent.

Such embodiments provide an efficient scheduling mechanism between the charger (DC) messages and utility messages, and provide fast and efficient communication that adheres to round trip latency requirements for the DC messages/commands 402. These embodiments may exploit the differences in latency requirements of utility messages 401 and DC messages 402, wherein: (i) reliable communication is needed for utility messages 401 without any stringent latency requirement, and (ii) fast and efficient communication with strict latency requirement is needed for DC messages/commands 402.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
 performing, by a power line communication (PLC) device
   assigning a first transmission priority to a first category of data messages to be communicated over a narrow-band PLC channel;
   assigning a second transmission priority to a charger equipment category of data messages to be communicated over the narrow-band PLC channel, the second transmission priority being higher than the first transmission priority;

communicating a data message of the first category over the narrow-band PLC channel;

halting initiation of further communication of the first category of data messages over the narrow-band PLC channel in response to a determination that at least one data message having the second transmission priority is queued for communication over the narrow-band PLC channel; and communicating the at least one data message having the second transmission priority in response to the second transmission priority and a determination that the narrow-band PLC channel is available.

2. The method of claim 1, further comprising:
reinitiating further communication of the first category of data messages in response to a determination that the at least one data message having the second transmission priority has been communicated and in response to a determination that the narrow-band communication channel is available.

3. The method of claim 1, wherein the determination that the narrow-band PLC channel is available comprises waiting for active communication of data messages having the first transmission priority to complete before communicating the at least one data message having the second transmission priority.

4. The method of claim 3, wherein halting initiation of further communication of the first category of data messages further comprises halting an acknowledgement (ACK) response to any active communication of the data messages having the first transmission priority completed.

5. The method of claim 1, wherein the first category of data messages are modulated according to a first modulation scheme selected to minimize the channel occupancy of the second category of data messages.

6. The method of claim 5, wherein the first modulation scheme is D8PSK.

7. The method of claim 1, wherein the second category of data messages are modulated according a second modulation scheme selected for robust communication.

8. The method of claim 7, wherein the second modulation scheme is ROBO modulation.

9. The method of claim 7, wherein the second modulation scheme is BPSK.

10. The method of claim 1, wherein the first category of data messages comprises utility messages.

11. The method of claim 1, wherein the charger equipment category of data messages comprises DC messages.

12. A power line communication (PLC) device, comprising:
a processor; and
a memory coupled to the processor, the memory configured to store program instructions executable by the processor to cause the PLC device to:
assign a first transmission priority to a first category of data messages to be communicated over a narrow-band PLC channel;
assign a second transmission priority to a charger equipment category of data messages to be communicated over the narrow-band PLC channel, the second transmission priority being higher than the first transmission priority;
communicate a data message of the first category over the narrow-band PLC channel;
halt initiation of further communication of the first category of data messages over the narrow-band PLC channel in response to a determination that at least one data message having the second transmission priority is queued for communication over the narrow-band PLC channel; and
communicate the at least one data message having the second transmission priority in response to the second transmission priority and a determination that the narrow-band PLC channel is available.

13. The PLC device of claim 12, further configured to:
reinitiate further communication of the first category of data messages in response to a determination that the at least one data message having the second transmission priority has been communicated and in response to a determination that the narrow-band communication channel is available.

14. The PLC device of claim 12, wherein the determination that the narrow-band PLC channel is available comprises waiting for active communication of data messages having the first transmission priority to complete before communicating the at least one data message having the second transmission priority.

15. The PLC device of claim 14, wherein halting initiation of further communication of the first category of data messages further comprises halting an acknowledgement (ACK) response to any active communication of the data messages having the first transmission priority completed.

16. The PLC device of claim 12, wherein the first category of data messages are modulated according to a first modulation scheme selected to minimize the channel occupancy of the second category of data messages.

17. The PLC device of claim 12, wherein the second category of data messages are modulated according a second modulation scheme selected for robust communication.

18. The PLC device of claim 12, wherein the first category of data messages comprises utility messages.

19. The PLC device of claim 12, wherein the charger equipment category of data messages comprises DC messages.

20. A non-transitory electronic storage medium having program instructions stored thereon that, upon execution by a processor within a power line communication (PLC) device, cause the PLC device to:
assign a first transmission priority to a first category of data messages to be communicated over a narrow-band PLC channel;
assign a second transmission priority to a charger equipment category of data messages to be communicated over the narrow-band PLC channel, the second transmission priority being higher than the first transmission priority;
communicate a data message of the first category over the narrow-band PLC channel;
halt initiation of further communication of the first category of data messages over the narrow-band PLC channel in response to a determination that at least one data message having the second transmission priority is queued for communication over the narrow-band PLC channel; and
communicate the at least one data message having the second transmission priority in response to the second transmission priority and a determination that the narrow-band PLC channel is available.

* * * * *